United States Patent
Chang et al.

(10) Patent No.: US 9,027,357 B2
(45) Date of Patent: May 12, 2015

(54) METHOD FOR DETERMINING IF REFRIGERANT CHARGE IS SUFFICIENT AND CHARGING REFRIGERANT

(75) Inventors: Seung Yong Chang, Seoul (KR); Chang Min Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 1522 days.

(21) Appl. No.: 12/382,630

(22) Filed: Mar. 19, 2009

(65) Prior Publication Data

US 2009/0235675 A1 Sep. 24, 2009

(30) Foreign Application Priority Data

Mar. 21, 2008 (KR) ........................ 10-2008-0026348

(51) Int. Cl.
*F25B 45/00* (2006.01)
*F25B 13/00* (2006.01)

(52) U.S. Cl.
CPC .................. *F25B 45/00* (2013.01); *F25B 13/00* (2013.01); *F25B 2345/001* (2013.01); *F25B 2400/13* (2013.01); *F25B 2600/021* (2013.01); *F25B 2700/13* (2013.01); *F25B 2700/1931* (2013.01); *F25B 2700/1933* (2013.01); *F25B 2700/21151* (2013.01); *F25B 2700/21152* (2013.01); *Y02B 30/741* (2013.01); *Y10S 62/22* (2013.01)

(58) Field of Classification Search
USPC .............................. 62/77, 149, 324.4, DIG. 22
See application file for complete search history.

(56) References Cited

U.S. PATENT DOCUMENTS

| | | | |
|---|---|---|---|
| 3,813,893 A * | 6/1974 | Gemender et al. ............... | 62/129 |
| 4,688,388 A * | 8/1987 | Lower et al. ..................... | 62/126 |
| 5,214,918 A | 6/1993 | Oguni et al. | |
| 7,752,855 B2 * | 7/2010 | Matsuoka et al. ............... | 62/149 |
| 2004/0050083 A1 * | 3/2004 | Yuasa et al. ..................... | 62/222 |
| 2006/0117767 A1 * | 6/2006 | Mowris ............................ | 62/149 |
| 2009/0146798 A1 * | 6/2009 | Gencyuz et al. ............... | 340/456 |

FOREIGN PATENT DOCUMENTS

| | | |
|---|---|---|
| EP | 1965150 A1 | 9/2008 |
| EP | 1970653 A1 | 9/2008 |
| EP | 2088391 A2 | 8/2009 |
| KR | 10-2004-0016447 A | 2/2004 |
| KR | 10-2007-0032683 A | 3/2007 |
| WO | WO 2007/069581 | 6/2007 |
| WO | WO 2007/069624 | 6/2007 |

OTHER PUBLICATIONS

Trane—Product Data, 2012, Publication No. 22-1792-08.*

* cited by examiner

*Primary Examiner* — Lakiya Rogers
*Assistant Examiner* — Orlando E Aviles Bosques
(74) *Attorney, Agent, or Firm* — McKenna Long & Aldridge LLP

(57) ABSTRACT

An air-conditioner and the refrigerant charging method of the air-conditioner are disclosed. When a refrigerant amount determining mode is requested to be performed, whether or not the refrigerant amount in the air-conditioner is proper is automatically determined and a shortage amount of refrigerant can be charged. Thus, a user can easily check whether or not the refrigerant charged in the air-conditioner is sufficient or insufficient, and if the refrigerant is not sufficient, the user can automatically charge the refrigerant without having to entirely remove the refrigerant from the air-conditioner, thus increasing the user convenience and reducing time and costs.

8 Claims, 5 Drawing Sheets

METHOD FOR DETERMINING IF REFRIGERANT CHARGE IS SUFFICIENT AND CHARGING REFRIGERANT

This application claims the benefit of Korean Patent Application No. 10-2008-0026348, filed on Mar. 21, 2008, which is hereby incorporated by reference as if fully set forth herein.

BACKGROUND OF THE INVENTION

1. Field of the Invention

The present invention relates to an air-conditioner and a method for charging a refrigerant of an air-conditioner, and more particularly, to an air-conditioner and a refrigerant charging method of an air-conditioner capable of automatically charging a refrigerant when the amount of refrigerant charged in the air-conditioner is not sufficient.

2. Description of the Related Art

As for a multi-air-conditioner, if a refrigerant flowing in the multi-air-conditioner is more than or less than a fixed quantity, a system performance is degraded, and worse, the multi-air-conditioner may be damaged. In the related art, a manometer (or a pressure gauge) is installed at a particular position of the air-conditioner to determine overs and shorts of the amount of refrigerant based on the pressure of the refrigerant detected by the monometer. However, only an expert or a technician of the air-conditioner is able to determine the overs and shorts of the refrigerant by using such method, so using of the method is inconvenient for general users. In addition, even the technician has no choice but to determine the overs and shorts of the refrigerant indirectly, lowering the reliability of the results of the determination of the overs and shorts of the refrigerant. Thus, in most cases, the refrigerant in the air-conditioner is wholly removed out, and then, the air-conditioner is charged with a new refrigerant. Such unnecessary re-charging of the air-conditioner with the new refrigerant takes much time and incurs much cost. In addition, the operation of the air-conditioner should be stopped for the process of re-charging the refrigerant, which causes user inconvenience.

SUMMARY OF THE INVENTION

Thus, an object of the present invention is to provide an air-conditioner and a method for charging a refrigerant of the air-conditioner capable of automatically charging a refrigerant if the refrigerant charged in the air-conditioner is insufficient.

To achieve the above object, there is provided a method for charging a refrigerant of an air-conditioner, including: receiving a request for performing a refrigerant amount determining mode to determine whether or not a refrigerant charged in the air-conditioner is proper; if it is determined that the refrigerant amount determining mode can be started while the air-conditioner is operated in a first operation mode, changing the air-conditioner to a second operation mode; determining whether or not the refrigerant charged in the air-conditioner is proper while the air-conditioner is operated in the second operation mode; and if the refrigerant charged in the air-conditioner is not sufficient, charging a certain amount of refrigerant to the air-conditioner.

The first operation mode may be a mode for operating the air-conditioner in a blowing mode, and after the air-conditioner is operated in the blowing mode, if an indoor temperature and an outdoor temperature are within a pre-set temperature range, respectively, in a state that pre-set condition is met, it may be determined that the refrigerant amount determining mode can be started. In this case, the pre-set condition may be a condition that an operation time (time period or duration) of the blowing mode is a pre-set time or longer.

The air-conditioner may be a multi-air-conditioner including a plurality of indoor units, and the second operation mode may be an all-room cooling operation mode in which the plurality of indoor units are operated for cooling.

The method may further include: determining whether or not the air-conditioner is stable after the air-conditioner is changed to the second operation mode. In determining whether or not the air-conditioner is stable, if a plurality of operation variables of the air-conditioner are within pre-set ranges, it may be determined that the air-conditioner is stable.

The air-conditioner may include an outdoor heat exchanger and an indoor heat exchanger that heat-exchange a refrigerant; and a liquid pipe (connection pipe) that connects the outdoor heat exchanger and the indoor heat exchanger, and whether or not the refrigerant charged in the air-conditioner is proper may be determined based on the temperature of the liquid pipe. The air-conditioner may further include a liquid pipe temperature sensor installed at the liquid pipe, and if the temperature of the liquid pipe detected by the liquid pipe temperature sensor is higher than a pre-set liquid pipe temperature, it may be determined that the refrigerant charged in the air-conditioner is insufficient.

The method may further include: if the refrigerant charged in the air-conditioner is proper after the certain amount of refrigerant is charged in the air-conditioner, preventing the refrigerant from being introduced any further.

The air-conditioner and the refrigerant charging method of the air-conditioner according to the present invention are advantageous in that when the refrigerant amount determining mode is requested to be performed, whether or not the refrigerant amount in the air-conditioner is proper is automatically determined and a shortage amount of refrigerant can be charged. Thus, a user can easily check whether or not the refrigerant charged in the air-conditioner is sufficient or insufficient, and if the refrigerant is not sufficient, the user can automatically charge the refrigerant without having to entirely remove the refrigerant from the air-conditioner, thus increasing the user convenience and reducing time and costs.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Air-conditioners include a general air-conditioner that performs a cooling operation, a heater that performs a heating operation, a general heat pump type air-conditioner that performs both cooling and heating operations, and a multi-air-conditioner that cools/heats a plurality of indoor spaces. Hereinafter, the multi-air-conditioner will now be described in detail as an embodiment of the air-conditioner.

Figure 1:
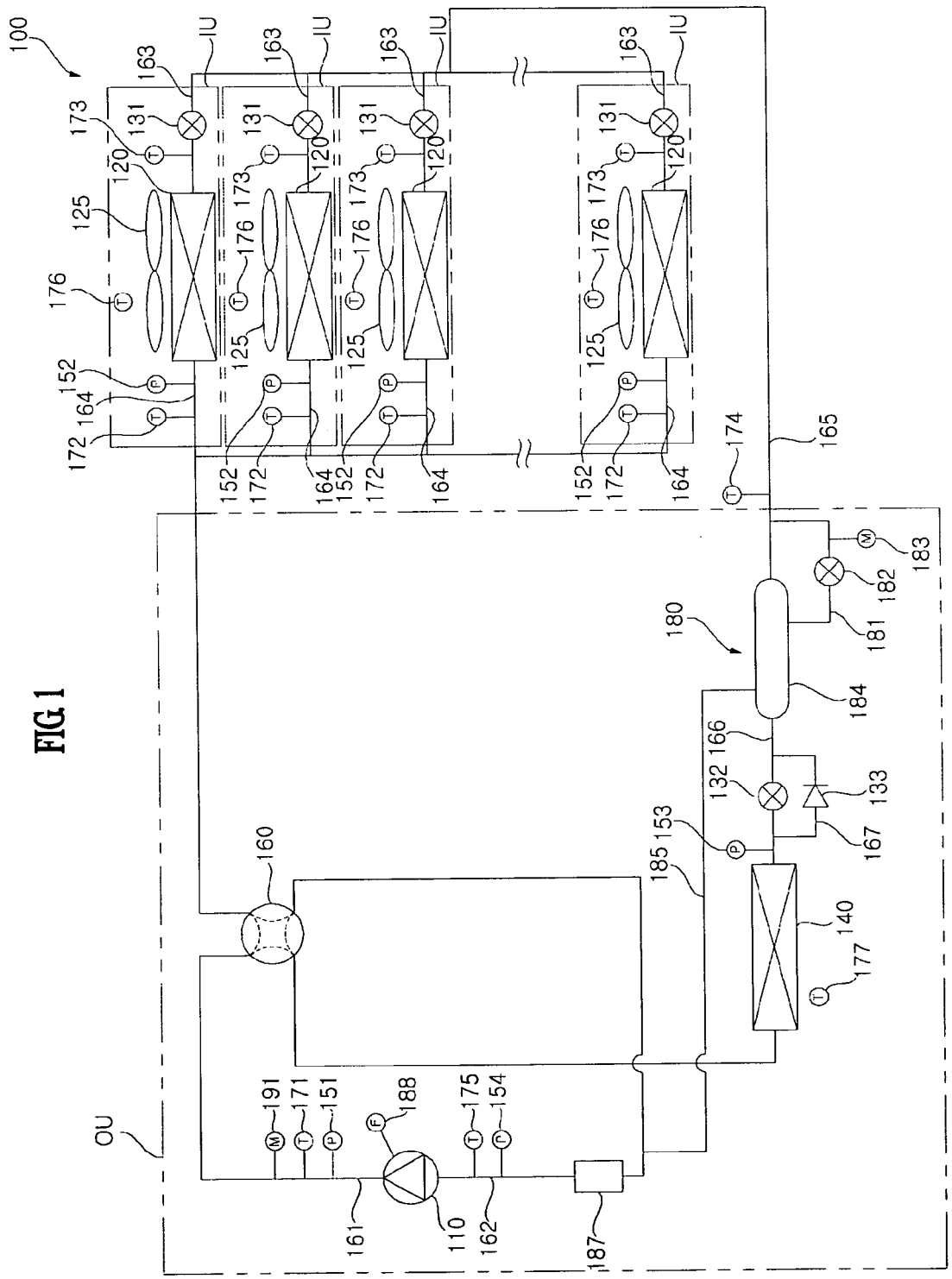
FIG. 1 shows a configuration of a multi-air-conditioner applied for a refrigerator charging method of an air-conditioner according to an embodiment of the present invention.

FIG. 1 shows the configuration of a multi-air-conditioner (referred to as an 'air-conditioner', hereinafter) 100 applied for a refrigerator charging method of an air-conditioner according to an embodiment of the present invention. With reference to FIG. 1, the air-conditioner includes an outdoor unit (OU) and indoor units (IUs). The OU includes a compressor 110, an outdoor heat exchanger 140, an outdoor expansion valve 132, a supercooler 180, and a controller (not shown). Although the air-conditioner 100 is shown to have a single OU, but the present invention is not limited thereto and the air-conditioner 100 may include a plurality of OUs.

The IUs include an indoor heat exchanger 120, an indoor air blower 125, and an indoor expansion valve 131, respectively. The indoor heat exchanger 120 acts as an evaporator for a cooling operation and acts as a condenser for a heating operation. The outdoor heat exchanger 140 acts as a condenser for a cooling operation and acts as an evaporator for a heating operation.

The compressor 110 compresses an introduced low temperature low pressure refrigerant into a high temperature high pressure refrigerant. The compressor 110 may have various structures, and an inverter type compressor may be employed. A flow sensor 191, a discharge temperature sensor 171, and a discharge pressure sensor 151 are installed at a discharge pipe 161 of the compressor 110. A suction temperature sensor 175 and a suction pressure sensor 154 are installed at a suction pipe (or intake pipe) 162 of the compressor, and a frequency sensor 188 is installed to measure the frequency of the compressor 110. The OU is shown to have one compressor 110, but without being limited thereto, the present invention may include a plurality of compressors. An accumulator 187 s installed at the suction pipe 162 of the compressor 110 to prevent a liquid refrigerant from being introduced into the compressor 110.

A four-way valve 160, a flow path switching valve for switching the cooling and heating, guides the refrigerant compressed by the compressor 110 to the outdoor heat exchanger 140 for the cooling operation and guides the compressed refrigerant to the indoor heat exchangers 120 for the heating operation.

The indoor heat exchangers 120 are disposed in the respective indoor spaces. In order to measure the temperature of the indoor spaces, indoor temperature sensors 176 are installed. The indoor expansion valves 131 are units for throttling the introduced refrigerant when the cooling operation is performed. The indoor expansion valves 131 are installed at indoor inlet pipes 163 of the IUs. Various types of indoor expansion vales 131 may be used, and an electronic expansion valve may be used for user convenience. Indoor inlet pipe temperature sensors 173 are installed at the indoor inlet pipes 163. Specifically, the indoor inlet pipe temperature sensors 173 are installed between the indoor heat exchangers 120 and the indoor expansion valves 131, respectively. In addition, indoor outlet pipe temperature sensors 172 and indoor pressure sensors 152 are installed at the indoor outlet pipes 164.

The outdoor heat exchanger 140 is disposed in an outer space. An outdoor temperature sensor 177 is installed to measure the temperature of an outdoor space. A liquid pipe temperature sensor 174 is installed at a liquid pipe 165 that connects the outdoor expansion valve 132 and the IUs. The outdoor expansion valve 132, which throttles the refrigerant introduced when the heating operation is performed, is installed at the liquid pipe 165. A first bypass pipe 167 for allowing the refrigerant to bypass the outdoor expansion valve 132 is installed at an inlet pipe 166 connecting the liquid pipe 165 and the outdoor heat exchanger 140, and a check valve 133 is installed at the first bypass pipe 167. The check valve 133 allows the refrigerant to flow from the outdoor heat exchanger to the IUs when the cooling operation is performed, and prevents the refrigerant from flowing when the heating operation is performed. An outdoor pressure sensor 153 is installed at the inlet pipe 166.

The supercooler 180 includes a supercooling heat exchanger 184, a second bypass pipe 181, a supercooling expansion valve 182, and a discharge pipe 185. The supercooling heat exchanger 184 is installed at the inlet pipe 166. During the cooling operation, the second bypass pipe 181 bypasses the refrigerant discharged from the supercooling heat exchanger 184 to allow the refrigerant to be introduced into the supercooling heat exchanger 184. The supercooling expansion valve 182 is disposed at the second bypass pipe 181, throttles the liquid refrigerant introduced into the second bypass pipe 181 to lower the pressure and temperature of the refrigerant, so as for the refrigerant to be introduced into the supercooling heat exchanger 184. Accordingly, during the cooling operation, the high temperature condensed refrigerant which has passed through the outdoor heat exchanger 140 is supercooled by being heat-exchanged with the low temperature refrigerant which has been introduced through the second bypass pipe 181, and then flow to the IUs. The bypass refrigerant is heat-exchanged at the supercooling heat exchanger 184 and then introduced into the accumulator 187 through the discharge pipe 185. A bypass flowmeter 183 is installed at the second bypass pipe 181 to measure the amount of flow bypassed through the second bypass pipe 181.

Figure 2:
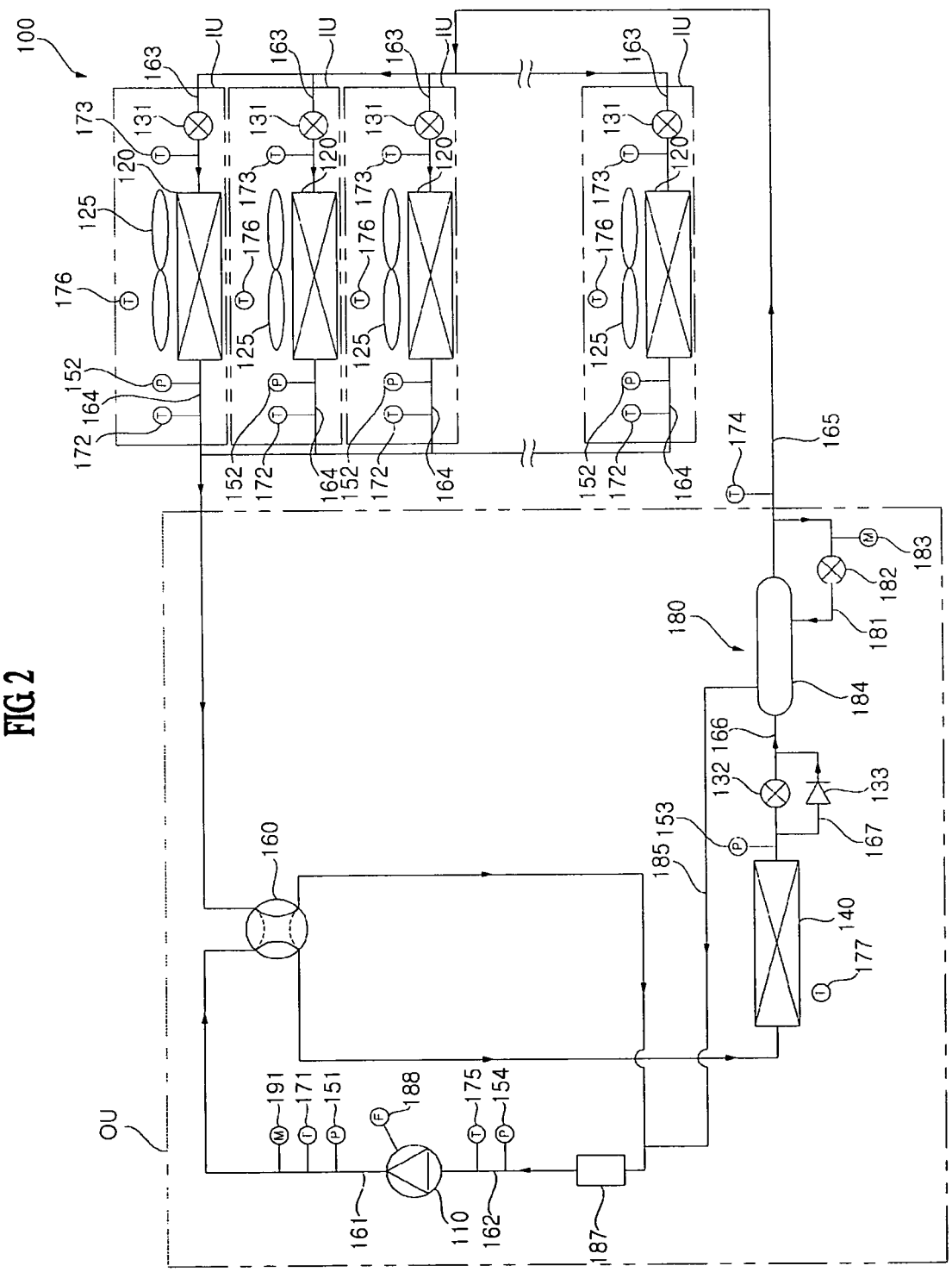
FIG. 2 illustrates a flow of a refrigerant when the air-conditioner is operated for cooling all the rooms.

FIG. 2 shows a flow of the refrigerant when the air-conditioner 100 performs an all-room cooling operation. With reference to FIG. 2, the high temperature high pressure gaseous refrigerant discharged from the compressor 110 is introduced into the outdoor heat exchanger 140 via the four-way valve 160, and then condensed in the outdoor heat exchanger. The outdoor expansion valve 132 is completely open. The indoor expansion valves 131 of the IUs are open at an opening degree which has been set for refrigerant throttling. Thus, the refrigerant discharged from the outdoor heat exchanger 140 is first introduced into the supercooler 180 through the outdoor expansion valve 132 and the check valve 133. The discharged refrigerant is supercooled by the supercooler 180 and then introduced into the IUs.

The refrigerant introduced into the IUs is throttled at the indoor expansion valve 131 and then evaporated at the indoor heat exchanger 120. The evaporated refrigerant is introduced into the suction pipe 162 of the compressor 110 through the four-way valve 160 and the accumulator 187. At this time, the indoor air blowers 125 are operated.

Figure 3:
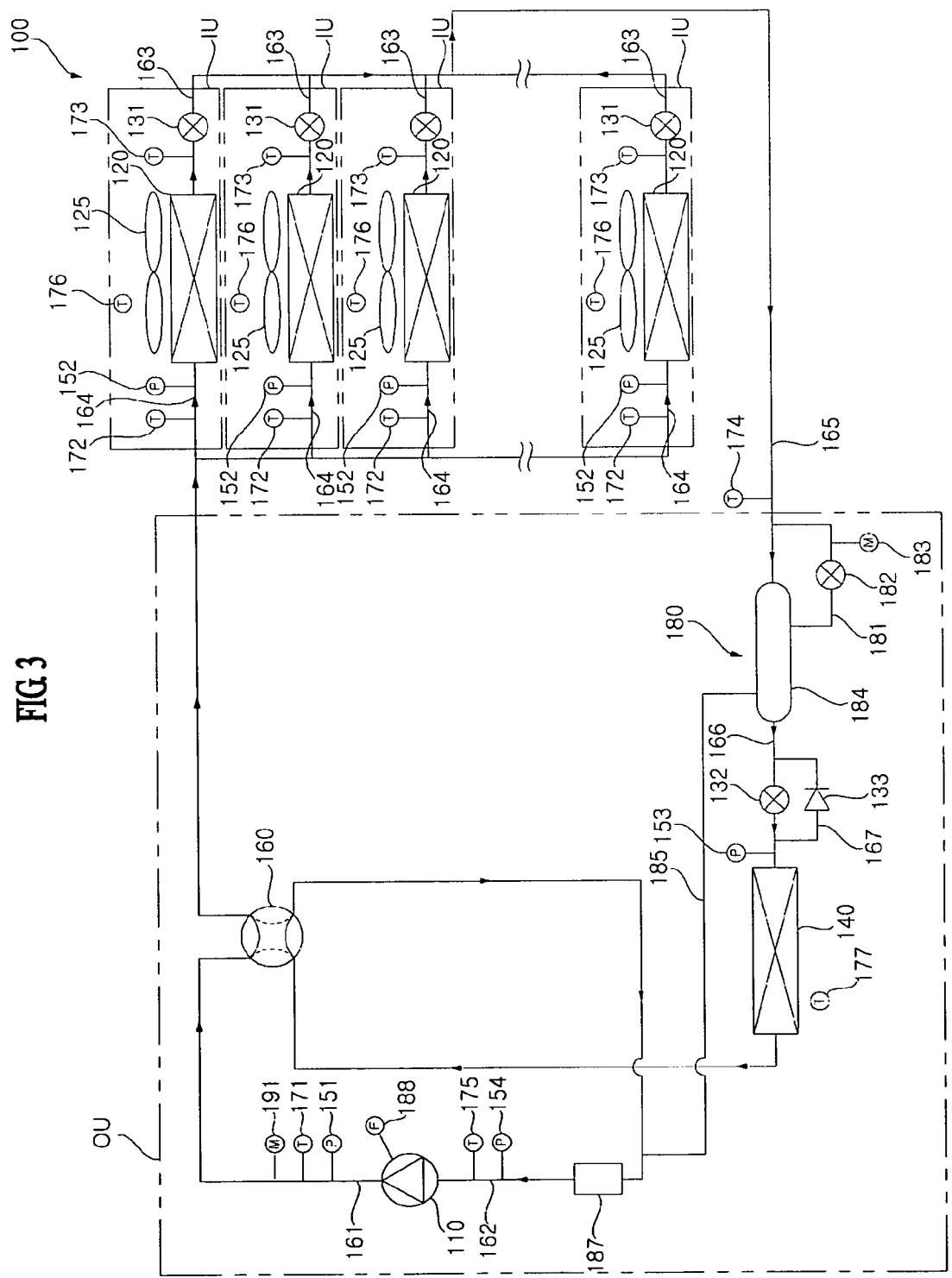
FIG. 3 illustrates a flow of a refrigerant when the air-conditioner is operated for heating all the rooms.

FIG. 3 shows the flow of the refrigerant when the air-conditioner 100 performs all-room heating operation. With reference to FIG. 3, the high temperature high pressure gaseous refrigerant discharged from the compressor 110 is introduced into the IUs through the four-way valve 160. The indoor expansion valves 131 of the IUs are completely open. In addition, the supercooling expansion valve 182 is closed. Accordingly, the refrigerant introduced from the IUs is throttled at the outdoor expansion valve 132 and then evaporated from the outdoor heat exchanger 140. The evaporated refrigerant is introduced into the suction pipe 162 of the compressor 110 through the four-way valve 160 and the accumulator 187. At this time, the indoor air blowers 125 are operated.

Figure 4:
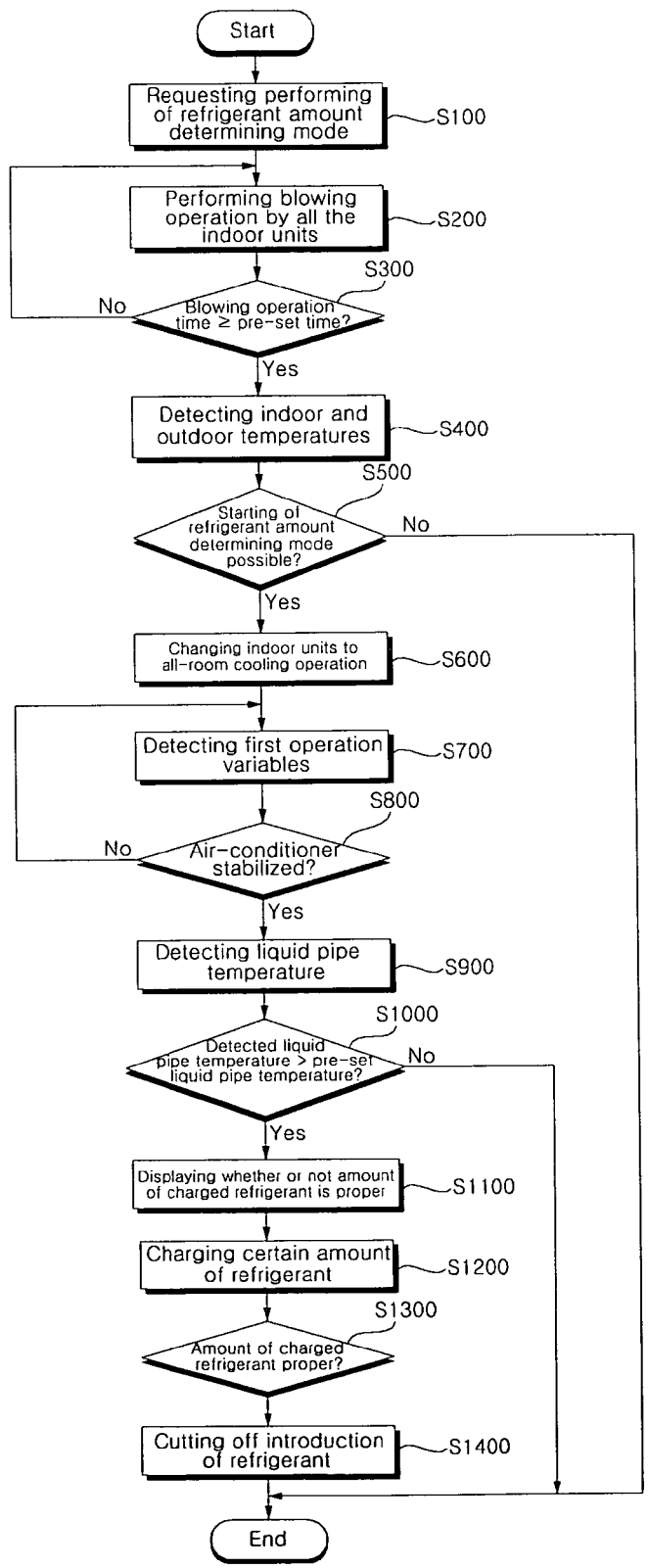
FIG. 4 is a flow chart illustrating a control flow of the refrigerant charging method of the air-conditioner according to an embodiment of the present invention.

FIG. 4 is a flow chart illustrating a control flow of the refrigerant charging method of the air-conditioner according to an embodiment of the present invention. With reference to FIG. 4, first, a required for performing of a refrigerant amount determining mode to determine whether or not the refrigerant charged in the air-conditioner 100 is proper is received from a user (S100). The controller (not shown) is installed in the OU, and the user requests performing of the refrigerant amount determining mode by using an input device (not shown).

Upon receiving the request for performing the refrigerant amount determining mode, the air-conditioner 100 is operated in a first operation mode (S200). Here, the first operation mode is a mode in which the air-conditioner 100 is operated in a blowing mode. The air-conditioner, specifically, the IUs, is/are operated in the blowing mode to thereby wholly ventilate the indoor and outdoor spaces and accurately obtain indoor and outdoor temperature values in measuring indoor and outdoor temperatures (to be described).

When the OU and all the IUs are operated in the blowing mode, namely, in the first operation mode (S200), the indoor expansion valves 131 and the outdoor expansion valves 132 are closed, so the refrigerant cannot be introduced into the IUs but the indoor air blowers 125 are operated.

After the air-conditioner 100 is operated in the blowing mode, it is determined whether or not a pre-set condition is met (S300). Here, the pre-set condition refers to whether or not the operation time of the blowing mode is greater than or equal to a pre-set time. As mentioned above, in order to enhance reliability in wholly ventilating the indoor and outdoor spaces and measuring the indoor and outdoor temperatures, the operation time of the blowing mode is preferably set to be longer than the pre-set time.

After the air-conditioner 100 is operated in the blowing mode for longer than the pre-set time, indoor and outdoor temperatures are received from the indoor temperature sensors 176 and the outdoor temperature sensors 177 (S400). If the indoor and outdoor temperatures are within pre-set temperature ranges, it is determined that the refrigerant amount determining mode can be started (S500). If the indoor temperature is lower than a temperature at which cooling operation can be performed by using the air-conditioner 100 or if the outdoor temperature is higher than a temperature at which the air-conditioner 100 can be operated, operation itself of the air-conditioner is not possible. Thus, it is required to determine whether or not the air-conditioner 100 can be operated by comparing the indoor and the outdoor temperatures with the pre-set temperature ranges. In this case, it may be determined that the refrigerant amount determining mode can be started only when all the outdoor and indoor temperatures as received satisfy the pre-set temperature ranges. Also, it may be determined that the refrigerant amount determining mode can be started only when a portion (or a number) of outdoor and indoor temperatures, among outdoor and indoor temperatures of the places where the plurality of IUs are installed, satisfies the pre-set temperature range.

When it is determined that the refrigerant amount determining mode can be started (S500), the operation mode of the air-conditioner 100 is changed to a second operation mode (S600). Here, the second operation mode may refer to an all-room cooling operation mode in which the plurality of IUs are operated for a cooling operation. Alternatively, the IUs may be changed for the all-room heating operation and operated.

After the air-conditioner 100 is changed to the all-room cooling operation mode, the second operation mode, before determining whether or not the refrigerant charged in the air-conditioner 100 is proper, first operation variables of the air-conditioner 100 are detected and analyzed (S700) to determine whether or not the air-conditioner 100 is in a stable state (S800). In detail, when the all-room cooling operation is performed, the first operation variables are detected (S700) to determine whether or not the air-conditioner 100 is in a stable state (S800). The first operation variables include an all-room cooling operation time, an operation frequency of the compressor 110, the difference between a target low pressure and a current low pressure, and the difference between a condensation temperature and the liquid pipe temperature. The stable state is determined depending on whether or not the first operation variables satisfy stabilization conditions. Namely, the all-room cooling operation time should be longer than a pre-set time, a variation value of the frequency of the compressor 110 should be smaller than a pre-set value during a pre-set time, the difference between the target low pressure and the current low pressure should be maintained below a pre-set value during a pre-set time, and the difference between the condensation temperature and the liquid pipe temperature should be larger than a pre-set value.

Here, the operation frequency of the compressor 110 is detected from information received from the frequency sensor 188. The current low pressure is a current evaporation pressure which is detected from an average pressure detected by the indoor pressure sensors 152. The condensation temperature is calculated as a saturation temperature corresponding to the pressure detected by the outdoor pressure sensor 153, and the liquid pipe temperature is detected from information detected by the liquid pipe temperature sensor 174. If the first operation variables do not satisfy the stabilization conditions during the pre-set time, whether or not the stabilization conditions are met can be detected again by setting and adjusting the number of target overheating degree of indoor units. However, in the present invention, the stabilization determining is not limited to the stabilization conditions with respect to the first operation variables, and whether or not the air-conditioner 100 is stable can be determined in consideration of various other operation variables.

When the air-conditioner 100 is determined to be stable, whether or not the amount of the refrigerant charged in the air-conditioner 100 is proper (S900, S1000). Because the air-conditioner 100 is first stabilized and then whether or not the amount of charged refrigerant is proper is automatically performed, so the amount of the charged refrigerant can be accurately determined.

In the embodiment of the present invention, whether or not the amount of refrigerant charged in the air-conditioner 100 is determined based on the temperature of the liquid pipe 165 of the air-conditioner. In detail, with reference to FIGS. I to 3, the liquid pipe temperature sensor 174 is installed at the liquid pipe 165 that connects the outdoor expansion valve 132 and the IUs. After the liquid pipe temperature is detected by the liquid pipe temperature sensor 174 (S900), if the detected liquid pipe temperature is higher than a pre-set liquid pipe temperature, it is determined that the refrigerant charged in the air-conditioner 100 is not sufficient (S1000).

When the amount of refrigerant is insufficient during the cooling operation, the supercooling degree is reduced due to the shortage of the amount of condensed refrigerant, increasing the opening degree of the supercooling expansion valve 182. Accordingly, the amount of refrigerant introduced into the IUs is reduced, a discharge temperature of the compressor 110 is increased, and a discharge overheating degree is increased. The temperature of all the pipes between the IUs and the OU goes up due to the increase in the discharge overheating degree, and accordingly, the temperature of the liquid pipe 165 also goes up. Thus, the controller (not shown) compares the liquid pipe temperature detected by the measurement-facilitated liquid pipe temperature sensor 174 installed at the liquid pipe 165 and a pre-set liquid pipe temperature to determine whether or not the charged refrigerant is excessive or insufficient.

Meanwhile, if the liquid pipe temperature detected by the liquid pipe temperature sensor 174 is lower than or the same as the pre-set liquid pipe temperature, the controller determines that the refrigerant charged in the air-conditioner 100 is proper and terminates the refrigerant amount determining and charging process.

Here, the shortage amount of refrigerant according to the difference between the detected liquid pipe temperature and the pre-set liquid pipe temperature may be made into a table through experimentation and stored in a database (not shown). The controller (not shown) may calculate the shortage amount of refrigerant according to the difference between the liquid pipe temperature and the pre-set liquid pipe temperature detected from the table, and charge the refrigerant as much as the shortage amount in the air-conditioner 100.

Whether or not the charged refrigerant is proper may be visually displayed (S1100). The controller (not shown) may display whether or not the refrigerant has been properly charged by using the table stored in the database. By visually displaying whether or not the charged refrigerant is proper and the shortage amount of refrigerant to the user, the user can visually check the shortage amount of the charged refrigerant and manually charge the refrigerant to the air-conditioner 100 or automatically charge the shortage amount of the refrigerant based on the refrigerant charging method according to the present invention.

If the refrigerant charged in the air-conditioner 100 is insufficient, a certain amount of refrigerant is charged to the air-conditioner 100 (S1200).

At this time, the certain amount of refrigerant refers to a pre-set amount of refrigerant, namely, a fixed quantity, and after the fixed quantity of refrigerant is charged, it may be determined whether or not the amount of charged refrigerant is proper. Alternatively, as stated above, the controller (not shown) may calculate the shortage amount of refrigerant according to the difference between the liquid pipe temperature detected from the table and the pre-set liquid pipe temperature and charge the refrigerant as much as the shortage amount to the air-conditioner. Whether or not the amount of charged refrigerant is proper may be determined by comparing the liquid pipe temperature detected by the liquid pipe temperature sensor 174 and the pre-set liquid pipe temperature.

If the amount of refrigerant charged in the air-conditioner 100 is determined to be proper (S1300), the refrigerant introduced into the air-conditioner 100 is cut off (S1400). The process of cutting off the introduction of the refrigerant will now be described in detail.

First, the four-way valve 160 is switched to cut off the introduction of the refrigerant and the operation of the compressor 110 is terminated. The four-way valve 160 is a flow path switching valve for switching (changing) cooling and heating operations. By switching the four-way valve 160 and terminating the operation of the compressor 110, the all-room cooling operations of the IUs can be stopped. In this case, when the four-way valve 160 is switched while the refrigerant is being charged, an equilibrium pressure is temporarily formed between the pipe with the high pressure refrigerant and the pipe with the low pressure refrigerant in the air-conditioner 100, restraining additional charging of the refrigerant. Thus, further introduction of the refrigerant can be cut off by switching the four-way valve 160 and terminating the operation of the compressor 110.

Figure 5:
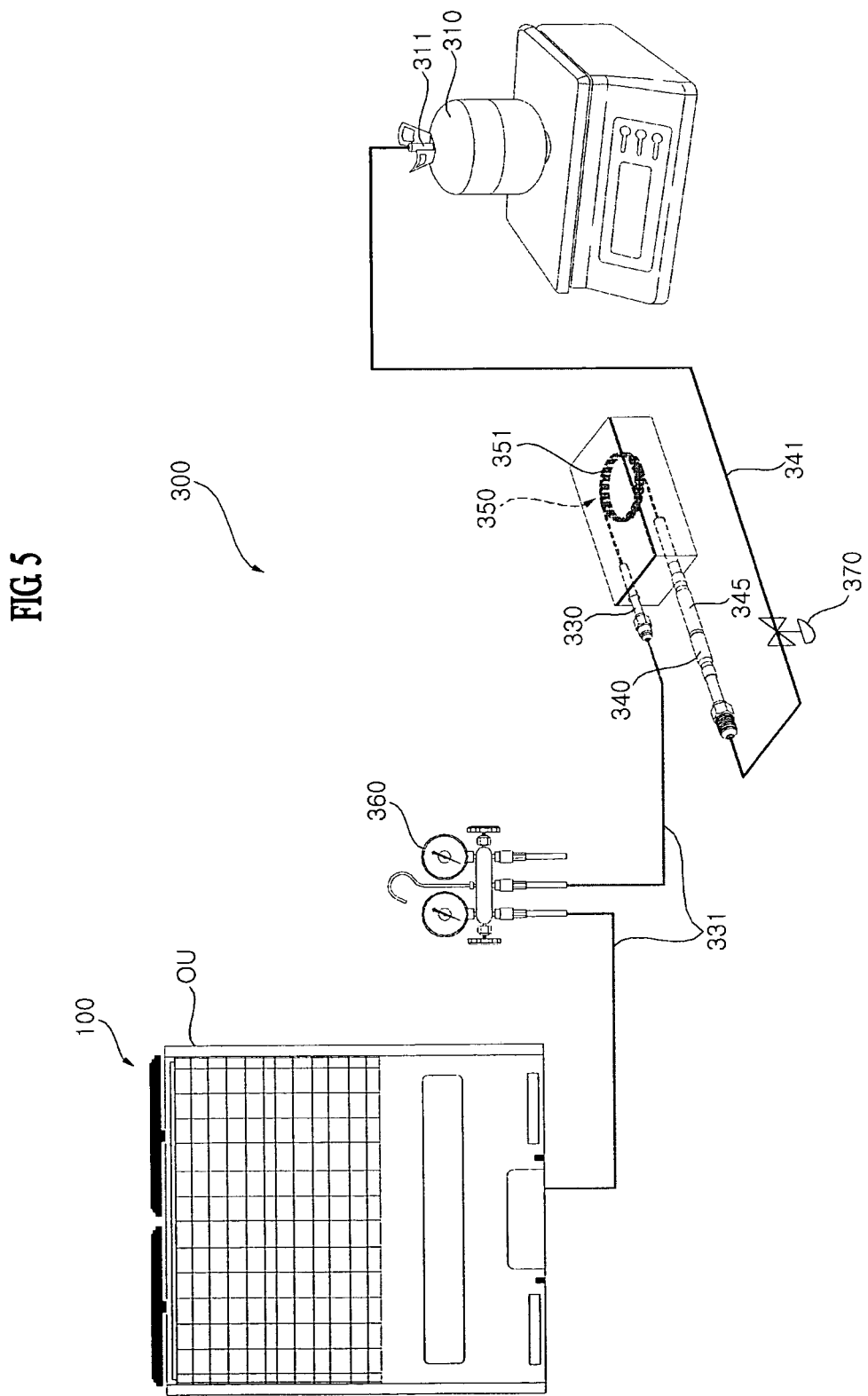
FIG. 5 shows a configuration of an outdoor unit of the air-conditioner illustrated in FIG. 1 and a refrigerant charging device.

FIG. 5 shows a configuration of the outdoor unit of the air-conditioner 100 illustrated in FIG. 1 and a refrigerant charging device. In order to cut off introduction of the refrigerant, a refrigerant charging device 300 that introduces the refrigerant into the air-conditioner 100 may be used.

With reference to FIG. 5, in order to charge the refrigerant to the air-conditioner 100, the refrigerant storage in a refrigerant storage unit 310 is supplied to the OU of the air-conditioner 100 by using the refrigerant charging device 300.

The refrigerant charging device 300 according to an embodiment of the present invention includes a pipe assembly 350. The pipe assembly 350 includes a first coupling pipe 330, a second coupling pipe 340, and a flow controller 351. Here, the refrigerant charging device 300 is coupled with the air-conditioner 100. The refrigerant charging device 300 may be fixedly coupled to be integrated with the OU of the air-conditioner 100 or detachably attached.

With reference to FIG. 1, the first coupling pipe 330 is coupled with the suction pipe 162 of the compressor 110 among the liquid pipes connected to a refrigerant circuit of the air-conditioner 100. The first coupling pipe 330 and the suction pipe 162 can be coupled via a first coupling hose 331 that connects one end of the first coupling pipe 330 and that of the suction pipe 162. Here, the first coupling hose 331 may be omitted, and the suction pipe 162 and the first coupling pipe 330 may be directly coupled.

The suction pipe 162 is provided at the entrance, namely, at a suction stage, of the compressor 110. Accordingly, the refrigerant introduced into the OU through the suction pipe 162 is introduced into the suction stage of the compressor 110, so as to have a high temperature and high pressure. However, the present invention is not limited thereto and the suction pipe 162 may be connected with any portion of the refrigerant circuit where the refrigerant flows within the air-conditioner 100 to supply the refrigerant to the OU.

A manifold gauge 360 may be installed at the first coupling hose 331. The manifold gauge 360 may indicate the pressure of the refrigerant, and without being limited thereto, the manifold gauge 360 may also indicate even a pressure-to-temperature of the refrigerant to indicate the temperature of the refrigerant over the pressure of the refrigerant. In charging the refrigerant, the manifold gauge 360 is connected to the air-conditioner 100 through various hoses or the like, and then, the refrigerant is charged until a certain operation pressure is reached.

In case of charging the shortage amount of refrigerant manually, the pressure is not uniformly maintained when the refrigerant is charged to the air-conditioner and the manifold gauge 360 varies slightly up and down while the air-conditioner 100 is being operated. Because accurate measurement can be performed after the refrigerant is stabilized to a degree (namely, uniform pressure), the pressure of the refrigerant is adjusted to a certain value, and then, after a certain time lapsed, the refrigerant is charged while checking the manifold gauge 360.

A connection pipe 311 is connected with the refrigerant storage unit 310, through which the refrigerant is introduced from the refrigerant storage unit 310, and the second coupling pipe 340 is connected with the connection pipe 311. The second coupling pipe 340 and the connection pipe 311 can be couple through a second coupling hose 341 that connects one end of the second coupling pipe 340 and that of the connection pipe 311.

With reference to FIG. 5, the flow controller 351 of the pipe assembly 350 connects the first coupling pipe 330 and the second coupling pipe 340, and limits the flow of refrigerant introduced into the OU of the air-conditioner 100. The flow speed of the refrigerant introduced into the air-conditioner 100 may be lowered by the flow controller 351. As the flow speed of the refrigerant introduced into the air-conditioner 100 is gradually lowered by the flow controller 351, the introduction of the refrigerant may be eventually cut off.

Namely, when the refrigerant by the shortage amount is supplied to the OU, the flow controller 351 prevents the refrigerant from being introduced while the shortage amount of the refrigerant is calculated at the initial stage, and if a large amount of flow of the refrigerant is introduced into the OU, there is a high possibility that the refrigerant exceeding the shortage amount is introduced into the OU, so the flow controller 351 limits the flow of the refrigerant such that the refrigerant introduced from the refrigerant storage unit 310 cannot be rapidly introduced into the OU. Thereafter, the flow of refrigerant is gradually reduced, and then, the introduction of the refrigerant is eventually cut off.

In order to limit the flow of the refrigerant introduced into the OU, the flow controller 351 may be a pipe with an inner diameter smaller than the first and second coupling pipes 330 and 340, and particularly, it may be a capillary tube. Here, the refrigerant charging device 300 may further include a cutoff valve 370 to cut off the refrigerant introduced into the air-conditioner 100 from the refrigerant storage unit 310.

The flow controller 351 may be a control valve for controlling the flow of the refrigerant by adjusting an opening degree. If the opening degree of the control valve is smaller than a certain level, the flow controller 351 may perform the function of a capillary tube as shown in FIG. 5. In addition, by completely closing or opening the control valve, it can also perform the function of the cutoff valve 370 as shown in FIG. 5.

With reference to FIG. 5, the refrigerant charging device 300 may further include a check valve 345 installed at the first coupling pipe 330 or the second coupling pipe 340 and preventing the refrigerant from flowing back to the refrigerant storage unit 310 from the air-conditioner 100. Namely, if the pressure of the refrigerant flowing to the OU from the refrigerant storage unit 310 is lowered, the refrigerant flowing in the pipes of the pipe assembly 350 might flow backward. Thus, in order to prevent the refrigerant from flowing backward, the check valve 340 is installed at the first coupling pipe 330 or the second coupling pipe 340, to thereby stably charge the refrigerant.

When the shortage amount of refrigerant is charged from the refrigerant storage unit 310 to the refrigerant circuit, the OU of the air-conditioner 100 can close the cutoff valve 370. The cutoff valve 370 may be provided at any portion of the refrigerant charging device 300. After the sufficient amount of refrigerant is introduced for charging, the refrigerant flowing in the pipe assembly 350 may be additionally introduced into the refrigerant circuit. Thus, only the required amount of refrigerant can be charged by closing the cutoff valve 370.

The preferred embodiments of the present invention have been described with reference to the accompanying drawings, and it will be apparent to those skilled in the art that various modifications and variations can be made in the present invention without departing from the scope of the invention. Thus, it is intended that any future modifications of the embodiments of the present invention will come within the scope of the appended claims and their equivalents.

What is claimed is:

1. A method for determining if refrigerant charge is sufficient and charging an air-conditioner with refrigerant, comprising:

receiving, at a controller of the air-conditioner, an instruction to evaluate a sufficiency of a charge of refrigerant in the air-conditioner, and in response thereto:

operating the air-conditioner in a first operation mode, wherein in the first operation mode is a mode in which the air-conditioner is operated in an all-room blowing mode, in which indoor air blowers of all indoor units of the air-conditioner are operated for blowing but indoor expansion valves and outdoor expansion valves are closed such that the refrigerant is not introduced into all the indoor units;

changing the operation of the air-conditioner to a second operation mode when an operation time of the all-room blowing mode is greater than or equal to a pre-set time, and an indoor temperature detected by an indoor temperature sensor and an outdoor temperature detected by an outdoor temperature sensor are within respective pre-set temperature ranges, wherein the second operation mode is an all-room cooling or heating operation mode, in which all the indoor units of the air-conditioner are operated for cooling or heating;

detecting a temperature of a liquid pipe that connects an outdoor heat exchanger and an indoor heat exchanger of the air-conditioner;

determining that the charge of refrigerant in the air-conditioner is not sufficient if the detected temperature of the liquid pipe is higher than a pre-set liquid pipe temperature;

calculating a shortage amount of refrigerant according to a difference between the detected liquid pipe temperature and the pre-set liquid temperature; and adding the calculated shortage amount of refrigerant to the air-conditioner.

2. The method of claim 1, further comprising:

detecting a first operation variable, subsequent to changing the air-conditioner to the second operation mode.

3. The method of claim 2, wherein the first operation variable is at least one of an all-room cooling operation time, an operation frequency of a compressor, a difference between a target low pressure and a current low pressure, and a difference between a condensation temperature and a temperature of a liquid pipe.

4. The method of claim 2, wherein adding the calculated shortage amount of refrigerant to the air-conditioner is performed when the first operation variable is within a pre-set range.

5. The method of claim 1, further comprising:

displaying whether or not the charge of refrigerant is sufficient, after determining if the charge of the refrigerant in the air-conditioner is sufficient.

6. The method of claim 1, further comprising:

preventing the refrigerant from being introduced to the air-conditioner if the charge of refrigerant in the air-conditioner is sufficient.

7. The method of claim 6, wherein, preventing the refrigerant from being introduced to the air-conditioner comprises:

switching a state of a four-way valve that guides refrigerant, which has been compressed by a compressor of the air-conditioner to the outdoor heat exchanger or the indoor heat exchanger; and terminating operation of the compressor.

8. The method of claim 1, wherein, adding the calculated shortage amount of refrigerant to the air-conditioner comprises:

passing refrigerant from a refrigerant storage unit through a flow controller, which limits the flow of the refrigerant, before the refrigerant is introduced into the air-conditioner.

* * * * *